United States Patent
Danielsen et al.

(10) Patent No.: US 10,982,649 B2
(45) Date of Patent: Apr. 20, 2021

(54) SYSTEM AND METHOD FOR DETECTING A PITCH FAULT IN A WIND TURBINE VIA VOLTAGE, CURRENT, TORQUE, OR FORCE MONITORING

(71) Applicant: General Electric Company, Schenectady, NY (US)

(72) Inventors: Darren John Danielsen, Simpsonville, SC (US); Philip James Verzella, Gray Court, SC (US)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 16/037,458

(22) Filed: Jul. 17, 2018

(65) Prior Publication Data
US 2020/0025173 A1 Jan. 23, 2020

(51) Int. Cl.
*F03D 7/02* (2006.01)
*F03D 7/04* (2006.01)

(52) U.S. Cl.
CPC ........... *F03D 7/0224* (2013.01); *F03D 7/042* (2013.01)

(58) Field of Classification Search
CPC ............................ F03D 7/0264; F03D 7/0268
See application file for complete search history.

(56) References Cited

U.S. PATENT DOCUMENTS

| | | | |
|---|---|---|---|
| 7,445,420 B2 | 11/2008 | Yoshida | |
| 7,728,452 B2 | 6/2010 | Atinaga et al. | |
| 8,038,395 B2 * | 10/2011 | Fric | F03D 7/0224 416/1 |
| 8,100,628 B2 | 1/2012 | Frese et al. | |
| 8,487,460 B2 * | 7/2013 | Krueger | F03D 7/0224 290/44 |
| 8,680,700 B2 | 3/2014 | Gomez De Las Heras Carbonell et al. | |
| 8,749,084 B2 | 6/2014 | Gjerlov et al. | |
| 9,371,819 B2 | 6/2016 | Grabau | |
| 9,416,771 B2 | 8/2016 | Obrecht et al. | |
| 2009/0066089 A1 | 3/2009 | Raga et al. | |
| 2009/0081041 A1 | 3/2009 | Frese et al. | |
| 2015/0337802 A1 | 11/2015 | Su et al. | |
| 2016/0160839 A1 * | 6/2016 | Wang | F03D 9/255 290/44 |

OTHER PUBLICATIONS

European Search Report, dated Nov. 22, 2019.
U.S. Appl. No. 15/984,936, filed May 21, 2018.

* cited by examiner

*Primary Examiner* — David Hamaoui
*Assistant Examiner* — Brian O Peters
(74) *Attorney, Agent, or Firm* — Dority & Manning, P.A.

(57) ABSTRACT

A method for reducing loads of a wind turbine includes determining an operational state of the wind turbine. The method also includes commanding a predetermined pitch event. Further, the method includes monitoring at least one operating condition of a pitch drive mechanism of a rotor blade of the wind turbine during the predetermined pitch event. If the operational state corresponds to a predetermined operational state and the operating condition(s) follows a pitch fault pattern during the predetermined pitch event, the method also include yawing a nacelle of the wind turbine away from an incoming wind direction.

18 Claims, 6 Drawing Sheets

SYSTEM AND METHOD FOR DETECTING A PITCH FAULT IN A WIND TURBINE VIA VOLTAGE, CURRENT, TORQUE, OR FORCE MONITORING

FIELD

The present disclosure relates generally to wind turbines, and more particularly to systems and methods for reducing wind turbine loads by yawing out of the wind based on blade stuck detection.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, when the wind turbine is parked or idling, conventional control strategies include actively tracking the wind direction to provide better alignment to the wind direction so as to minimize start-up delays when the wind speed increases or decreases back into the operating range.

However, in a situation where the wind turbine is faulted and one of the rotor blades remains stuck (unlike the normal idling situation), there are limited benefits to tracking the wind as repair is needed before restarting the wind turbine. In addition, in such situations, the wind turbine can experience increased loads due to the stuck rotor blade as well as rotor imbalance.

Accordingly, improved systems and methods for reducing loads during an idling or parked state of a wind turbine would be desired. In particular, the present disclosure is directed to systems and methods which actively yaw the nacelle of the wind turbine out of the wind when the wind turbine is idling or parked and one of the rotor blades is stuck so as to reduce loads during this scenario.

BRIEF DESCRIPTION

Aspects and advantages of the invention will be set forth in part in the following description, or may be obvious from the description, or may be learned through practice of the invention.

In one aspect, the present disclosure is directed to a method for reducing loads of a wind turbine. The method includes determining, via a controller, an operational state of the wind turbine. The method also includes commanding, via the controller, a predetermined pitch event. Further, the method includes monitoring, via the controller, at least one operating condition of a pitch drive mechanism of a rotor blade of the wind turbine during the predetermined pitch event. If the operational state corresponds to a predetermined operational state and the operating condition(s) follows a pitch fault pattern during the predetermined pitch event, the method may also include yawing a nacelle of the wind turbine away from an incoming wind direction.

In one embodiment, the step of monitoring the operating condition(s) of the pitch drive mechanism of the rotor blade may include monitoring at least one operating condition of a pitch actuator of the pitch drive mechanism. In such embodiments, the pitch actuator may include a rotary actuator, a linear actuator, or any other suitable actuating device.

In another embodiment, the predetermined pitch event may include acceleration to a first speed, dwelling at a predetermined speed for a predetermined time period, and/or deceleration to a second speed. In another embodiment, an acceleration rate of the acceleration may require full motor current of the rotary actuator or actuator force of the linear actuator.

In further embodiments, the operating condition(s) may include voltage, current, torque, force, pressure, flow rate, or any other suitable parameter of the pitch drive mechanism. In several embodiments, the predetermined operational state of the wind turbine may include an idling state, a parked state, turbine shutdown, or a maintenance state.

In particular embodiments, the pitch fault pattern may correspond to one or more of the operating conditions remaining substantially constant after initial variation due to system compliance during the predetermined pitch event in a first direction and one or more operating conditions being substantially symmetrical for an identical pitch event in an opposite direction.

In additional embodiments, the method may include preventing a rotor of the wind turbine from rotating during the predetermined pitch event. In yet another embodiment, the method may include monitoring a wind speed at the wind turbine and actively yawing the nacelle of the wind turbine away from the incoming wind direction only if the wind speed exceeds a set wind speed threshold.

In another aspect, the present disclosure is directed to a system for reducing loads of a wind turbine. The system includes at least one sensor configured for monitoring a rotor blade of the wind turbine and a controller communicatively coupled to the sensor(s). The controller includes at least one processor configured to perform one or more operations, including but not limited to determining an operational state of the wind turbine, commanding a predetermined pitch event, monitoring at least one operating condition of a pitch drive mechanism of a rotor blade of the wind turbine during the predetermined pitch event, and if the operational state corresponds to a predetermined operational state and the operating condition(s) follows a pitch fault pattern during the predetermined pitch event, yawing a nacelle of the wind turbine away from an incoming wind direction. It should also be understood that the system may further include any of the additional features as described herein.

In yet another aspect, the present disclosure is directed to a method for reducing loads of a wind turbine. The method includes commanding, via a controller, a predetermined pitch event. The method also includes monitoring, via the controller, at least one operating condition of a pitch drive mechanism of a rotor blade of the wind turbine during the predetermined pitch event. If the operating condition(s) varies from a standard operating pattern during the predetermined pitch event, the method further includes yawing a nacelle of the wind turbine away from an incoming wind direction.

In one embodiment, the standard operating pattern may correspond to a first operating condition of the pitch drive mechanism being proportional to a commanded speed of the pitch drive mechanism and a second operating condition reaching a maximum value during acceleration and plateauing at a lower value during constant speed. The first operating condition includes voltage, whereas the second operating condition includes at least one of current, force, torque, or pressure. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
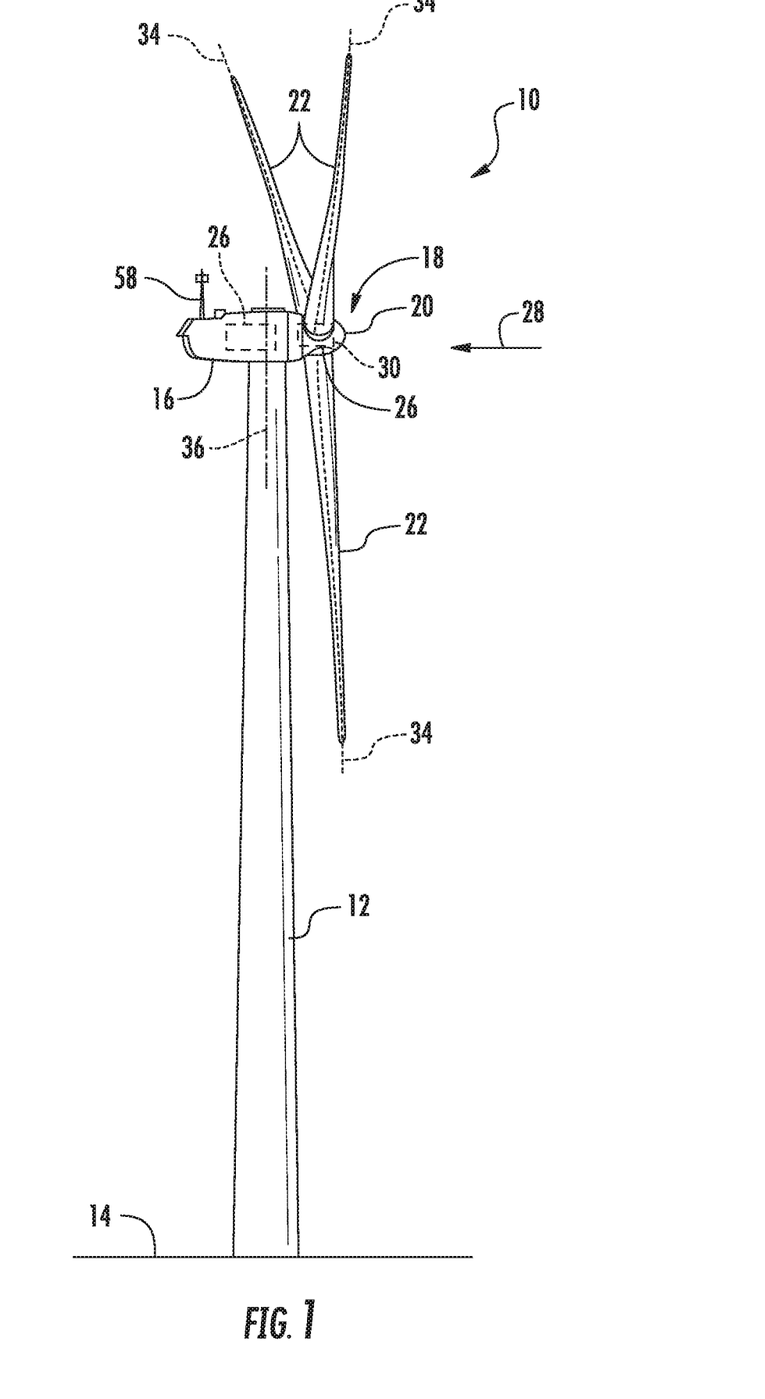
FIG. 1 illustrates a perspective view of a wind turbine according to one embodiment of the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
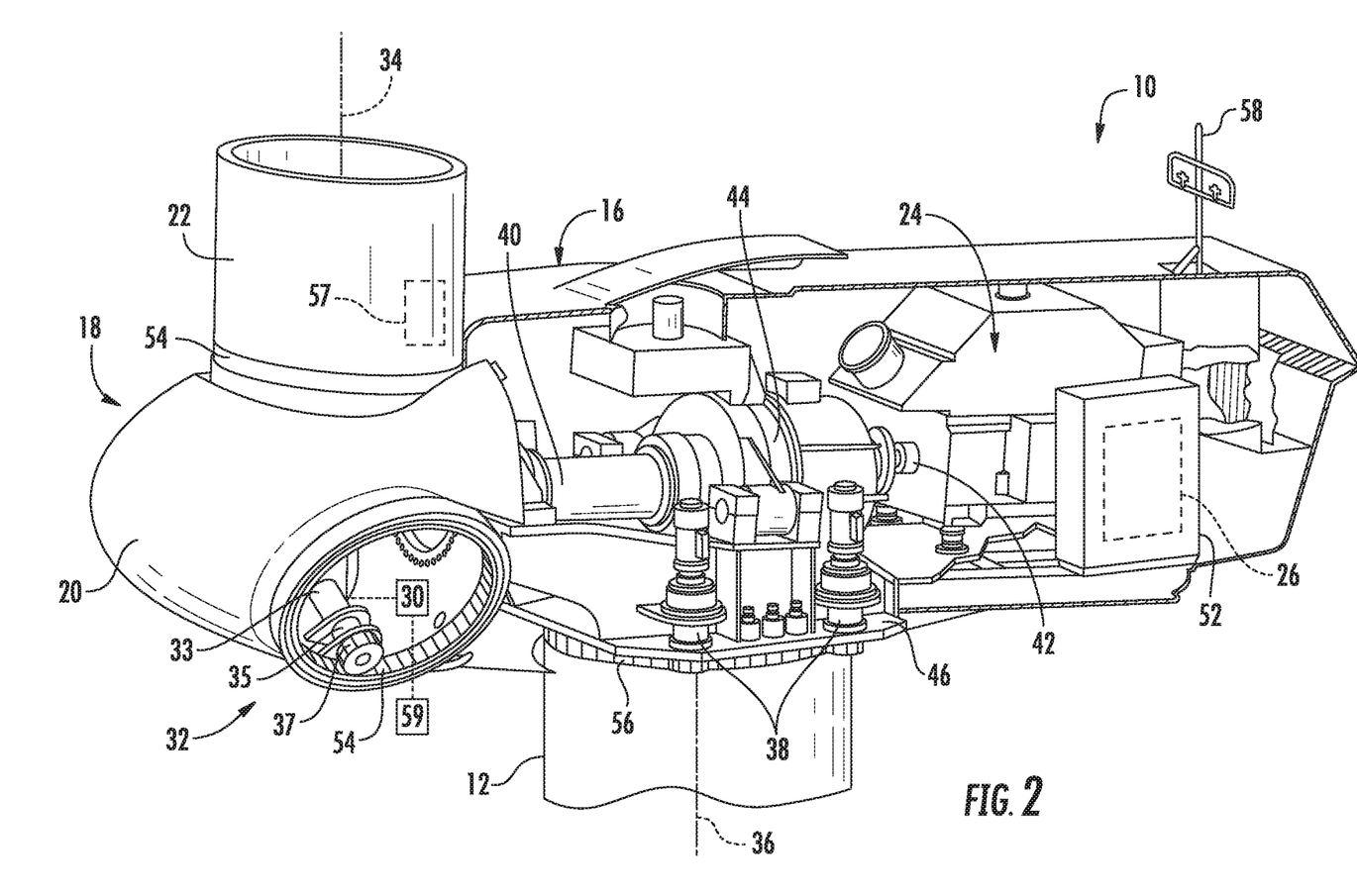
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58 may further be in communication with the controller 26, and may provide related information to the controller 26. For example, yawing of the wind turbine 10 may occur due to sensing of changes in the wind direction 28, in order to maintain alignment of the wind turbine 10 with the wind direction 28. In addition, yawing of the wind turbine 10 may occur due to sensing a stuck blade, which is described in more detail herein.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Still referring to FIG. 2, each rotor blade 22 may also include a pitch adjustment mechanism 32 configured to rotate each rotor blade 22 about its pitch axis 34. The pitch adjustment mechanism 32 described herein may include a rotary actuator system and/or a linear actuator system (such as hydraulic, pneumatic, or electric systems). Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34.

As such, the turbine controller 26 may be communicatively coupled to each pitch adjustment mechanism 32 of the wind turbine 10 (one of which is shown) through a pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that the pitch adjustment mechanism(s) 32 adjusts the pitch angle of the rotor blades 22 as described herein. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 of the wind turbine, or by directly controlling the operation of the plurality of pitch drives or pitch adjustment mechanisms.

In addition, as shown, the pitch drive mechanism(s) 32 described herein may also include an encoder 59 communicatively coupled to the pitch controller 30 and/or the turbine controller 26. In one embodiment, the encoder 59 may be an incremental encoder that provides encoder signals for input to the controllers 26, 30 via one or more I/O interfaces (not shown). Accordingly, the pitch encoder 59 may be in communication with the turbine controller 26 to produce speed signals representative of the pitch angular speed of the rotor blade 22.

Figure 3:
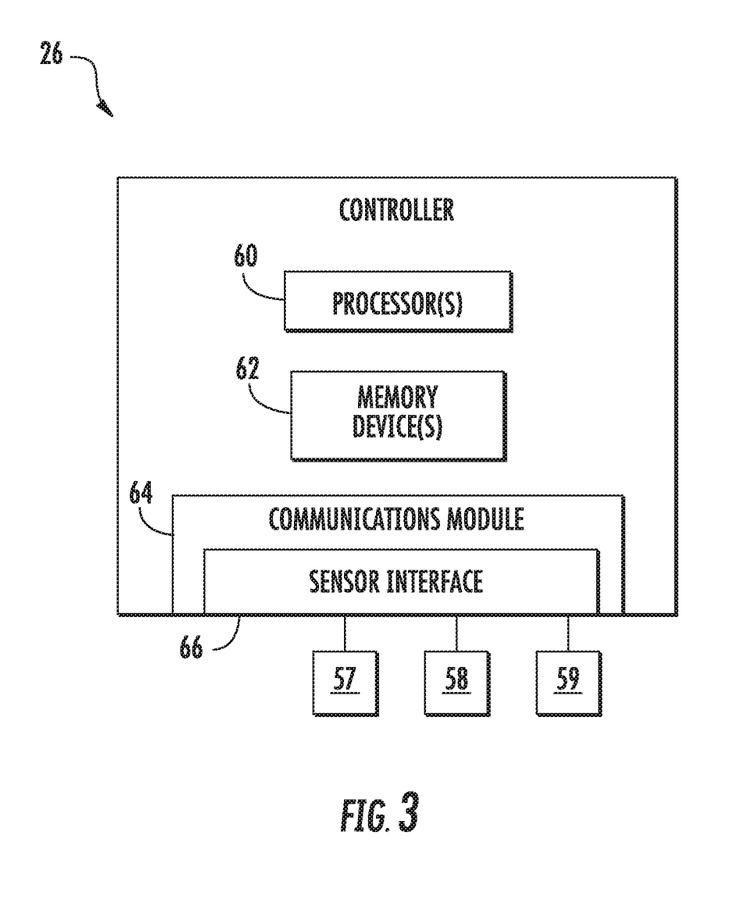
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58, 59 to be converted into signals that can be understood and processed by the processors 60. It should be appreciated that the sensors 57, 58, 59 may be communicatively coupled to the communications module 64 using any suitable means. For example, as shown in FIG. 3, the sensors 57, 58, 59 are coupled to the sensor interface 66 via a wired connection. However, in other embodiments, the sensors 57, 58, 59 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. For example, when the wind turbine 10 is in an idling state, the controller 26 actively tracks the wind direction to provide better alignment to the wind and minimize start-up delays when the wind speed increases or decreases back into the operating range. However, in a situation where the wind turbine 10 is in an idling or parked stated and one or more of the rotor blades 22 becomes stuck, there are limited benefits to tracking the wind because repair will be required before restarting the wind turbine 10. Thus, in such situations, the turbine controller 26 is configured to implement a control strategy to reduce the drag force on the faulted rotor blade so as to reduce loads thereon and/or to prevent rotor imbalance.

Figure 4:
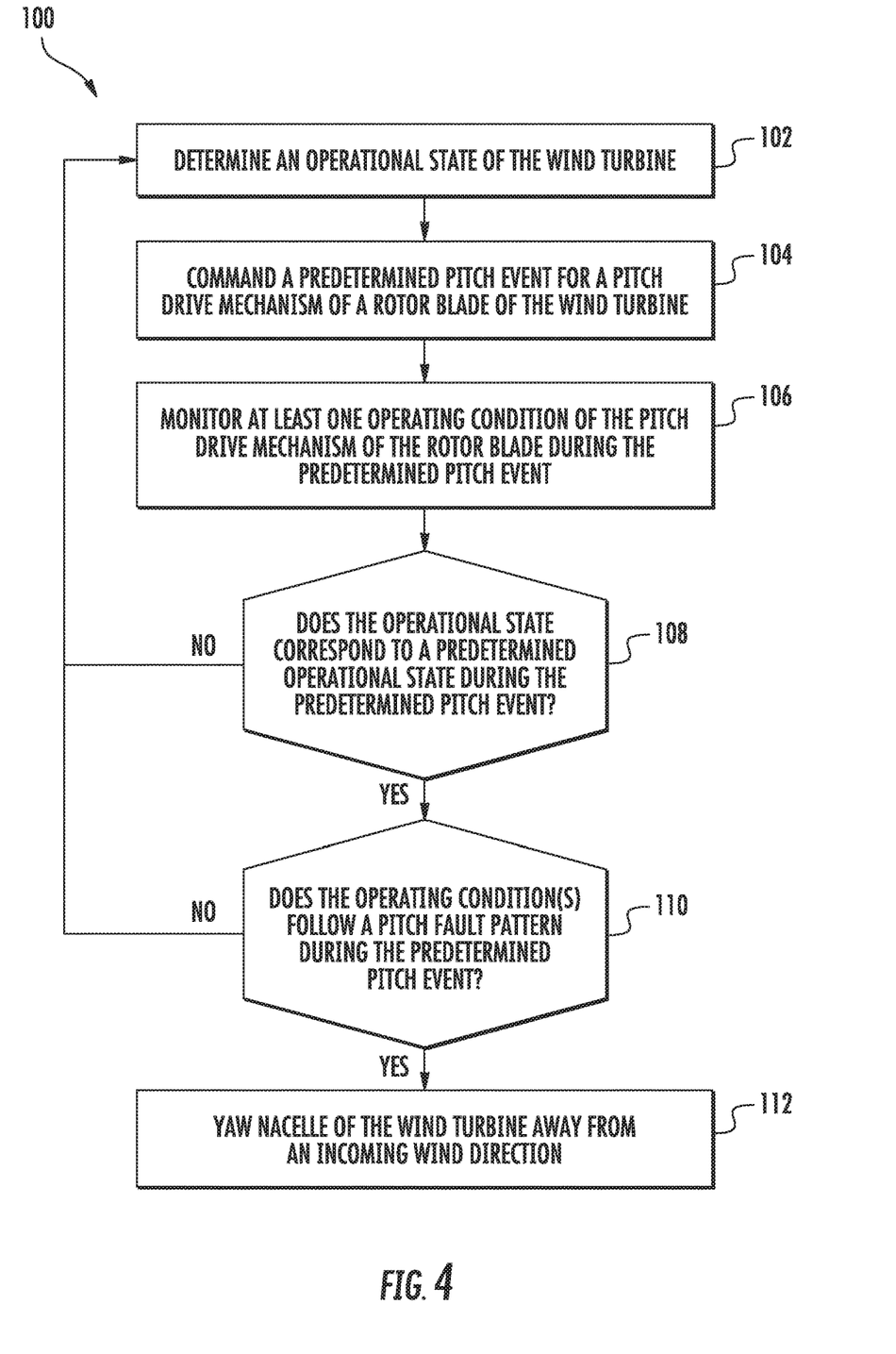
FIG. 4 illustrates a flow diagram of one embodiment of a method for reducing loads of a wind turbine according to the present disclosure.

More specifically, as shown in FIG. 4, a flow diagram of one embodiment of a method 100 for reducing loads of the wind turbine 10 in situations where the wind turbine 10 is in an idling or parked state and one or more of the rotor blades 22 is prevented from rotating (i.e. becomes stuck). In general, the method 100 will be described herein with reference to the wind turbine 10 shown in FIGS. 1 and 2, as well as the various controller components shown in FIG. 3. However, it should be appreciated that the disclosed method 100 may be implemented with wind turbines having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 102, the method 100 includes determining an operational state of the wind turbine 10. In such embodiments, the operational state of the wind turbine 10 may be an idling state, a parked state, and/or a maintenance state or combinations thereof. As used herein, the "idling state" of the wind turbine 10 generally refers to the operational state where, due to lack of wind or some other operational conditions (e.g. faults), the rotatable hub 20 of the wind turbine 10 is allowed to rotate (i.e. idle) at low rotational speeds, e.g. around 0.2 rpm, rather than being stopped completely. In contrast, a "parked state" of the wind turbine 10 generally refers to the operational state where the rotatable hub 20 is stopped and prevented from rotating. In addition, a "maintenance state" of the wind turbine 10 generally refers to operational state where the wind turbine 10 is undergoing a maintenance procedure and is shut down. Therefore, in certain embodiments, the maintenance state and the parked state may be synonymous.

Referring back to FIG. 4, as shown at 104, the method 100 includes commanding a predetermined pitch event for the pitch drive mechanism 32 of the rotor blade 22 of the wind turbine 10. For example, in one embodiment, the predetermined pitch event may include acceleration to a first speed (e.g. a quick acceleration in one direction), dwelling at a predetermined speed for a predetermined time period (e.g. a short time that may include 0), and/or deceleration to a second speed (e.g. zero), and then mirroring the steps in the opposite direction. In such embodiments, an acceleration rate of the acceleration may be chosen to require full motor current of the pitch drive motor 33 or actuator force of the pitch hydraulic device during acceleration (i.e. high acceleration). In addition, the top speed commanded may not require full torque or force (i.e. the commanded speed may be a relatively low maximum speed). Still other acceleration rates and speeds can be chosen as desired to optimize the test profile for the system.

As shown at 106, the method 100 includes monitoring at least one operating condition of the pitch drive mechanism 32 of the rotor blade 22 of the wind turbine 10 during the predetermined pitch event. For example, in one embodiment, the controller 26 (or the pitch controller 30) may be configured to monitor at least one operating condition of a pitch actuator 33 of the pitch drive mechanism 32. More specifically, in such embodiments, the pitch actuator 33 may include the pitch drive motor described herein, a pitch hydraulic device, or any other suitable actuating device. Thus, operating condition(s) described herein may include, for example, voltage, current, torque, force, pressure, flow rate, or any other suitable parameter of the pitch actuator of the pitch drive mechanism 32.

Still referring to FIG. 4, as shown at 108, the controller 26 is configured to determine whether the operational state corresponds to the predetermined operational state (e.g. the idling state). If so, as shown at 110, the controller 26 is also configured to determine whether the operating condition(s) follows a pitch fault pattern during the predetermined pitch event. For a standard operating pattern, the operating condition(s) will vary (typically in a predictable way) throughout the move. For situations relating to pitch system malfunctions, after potential initial variation due to system compliance, the operating condition(s) will remain fairly constant for the remainder of the move in that direction, and will be mostly symmetrical for an identical move in the opposite direction (if such a move is performed). More specifically, in certain embodiments, for a stuck rotor blade, motor voltage and/or fluid flow will typically be very low (i.e. possibly 0) compared to a normal move. Similarly, for a stuck blade, motor current, fluid/system pressure and/or force will be high (e.g. typically at the maximum allowed by the system) compared to a normal move).

In particular embodiments, for example, the pitch fault pattern may correspond to a first operating condition of the pitch drive mechanism 32 plateauing at the start of the predetermined pitch event and a second operating condition reaching a maximum value for the entire predetermined pitch event in a positive direction and a negative direction. In such embodiments, the first operating condition may be voltage, whereas the second operating condition may be current, force, or pressure (i.e. depending on the type of pitch actuator).

Figure 5:
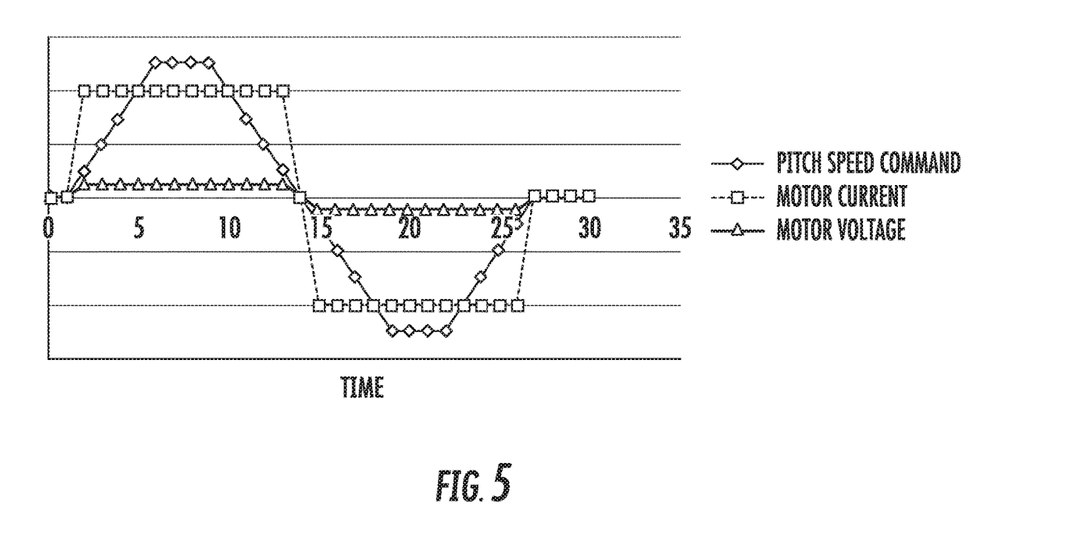
FIG. 5 illustrates a graph of one embodiment of the relationship between pitch speed, current, and voltage during a commanded pitch event for a wind turbine having a stuck rotor blade according to the present disclosure.

For example, as shown in FIG. 5, a graph of one embodiment of a pitch fault pattern according to the present disclosure is illustrated. As shown, the example pitch fault pattern includes the relationship of voltage, current, and the pitch speed command. The voltage in the example graph is motor back (counter) electromotive force (EMF) and may be measured either directly or indirectly. Accordingly, as shown, the voltage quickly plateaus due to no back electromotive force from the pitch drive motor 33 (i.e. since the motor is not rotating). In addition, as shown, the current (or force or hydraulic pressure where a hydraulic device is used) reaches its maximum value for the entire commanded move in both the positive and negative directions.

Referring back to FIG. 4, if, during the predetermined pitch event, the operational state corresponds to the predetermined operational state and the operating condition(s) follows the pitch fault pattern, as shown at 112, the controller 26 is configured to yaw the nacelle 16 of the wind turbine 10 away from an incoming wind direction 28. In one embodiment, e.g. during the idling state, the controller 26 may be configured to automatically yaw the nacelle 16 away from the incoming wind direction 28. In alternative embodiments, e.g. during the maintenance state, a user can manually select to yaw the nacelle 16 away from the incoming wind direction. Accordingly, yawing the nacelle 16 out of the wind in these situations provides substantial loads reduction. In another embodiment, the method 100 may also include monitoring the wind speed at the wind turbine 10, e.g. via wind sensor 58, and actively yawing the nacelle 16 of the wind turbine away from the incoming wind direction if the wind speed exceeds a set wind speed threshold.

In additional embodiments, the method 100 may include preventing the rotor 18 from rotating during the predetermined pitch event. For example, during normal operation of the wind turbine 10, the load will naturally vary during rotor rotation. For this reason, the system and method of the present disclosure may consider the rotor location during the commanded pitch event and/or may stop the rotor 18 from rotating to prevent the asymmetrical load from changing during the commanded pitch event. For example, in one embodiment, the controller 26 may limit the commanded pitch event to be short enough in duration such that the load change due to the rotor rotation may be minimal.

Figure 6:
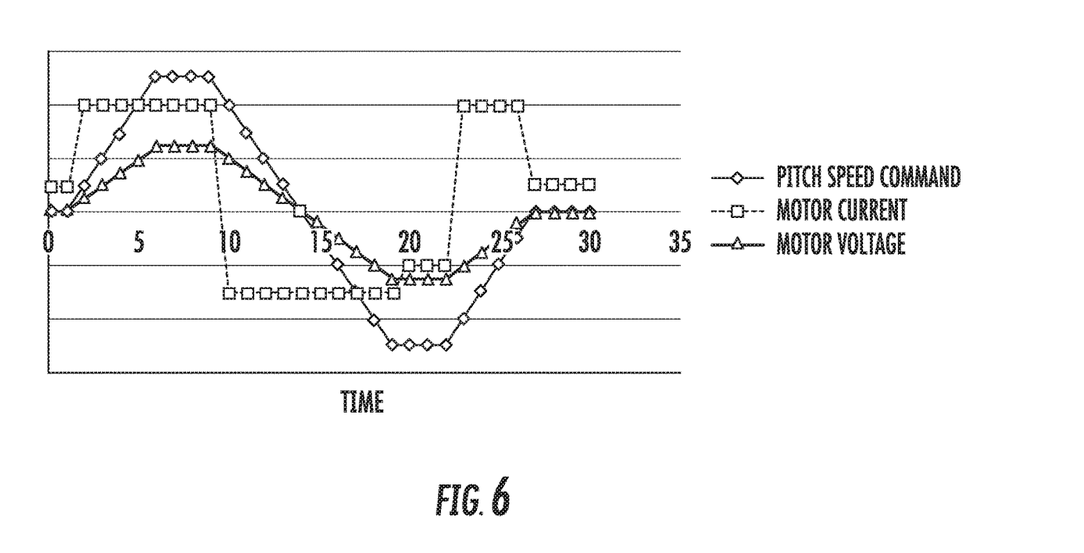
FIG. 6 illustrates a graph of one embodiment of the relationship between pitch speed, current, and voltage during a commanded pitch event for a normal wind turbine assuming asymmetrical rotor loading according to the present disclosure.

Referring now to FIG. 6, a graph of one embodiment of the relationship between pitch speed, current, and voltage during a commanded pitch event for a normal wind turbine assuming asymmetrical rotor loading (i.e. gravity is affecting load, e.g. the rotor blade 22 is not vertical) according to the present disclosure is illustrated. In such instances, as shown, the voltage is mostly proportional to the commanded speed. In addition, as shown, the current (or force or hydraulic pressure) reaches a maximum value during acceleration (which can be linear, non-linear, a step-response, or a derivative of acceleration) and may remain at the maximum value during constant speed in one direction. Conversely, in the opposite direction, as shown, the current (or force or hydraulic pressure) may not reach the maximum value during acceleration and may plateau at a significantly lower value during constant speed.

It should also be understood that if the wind turbine 10 continues to operate normally, the controller 26 is configured to continuously monitor the incoming wind direction 28 and yaw the nacelle 16 into the incoming wind direction 28 to provide improved alignment to the wind with minimal start-up delays when the wind speed increases or decreases back into the operating range.

Figure 7:
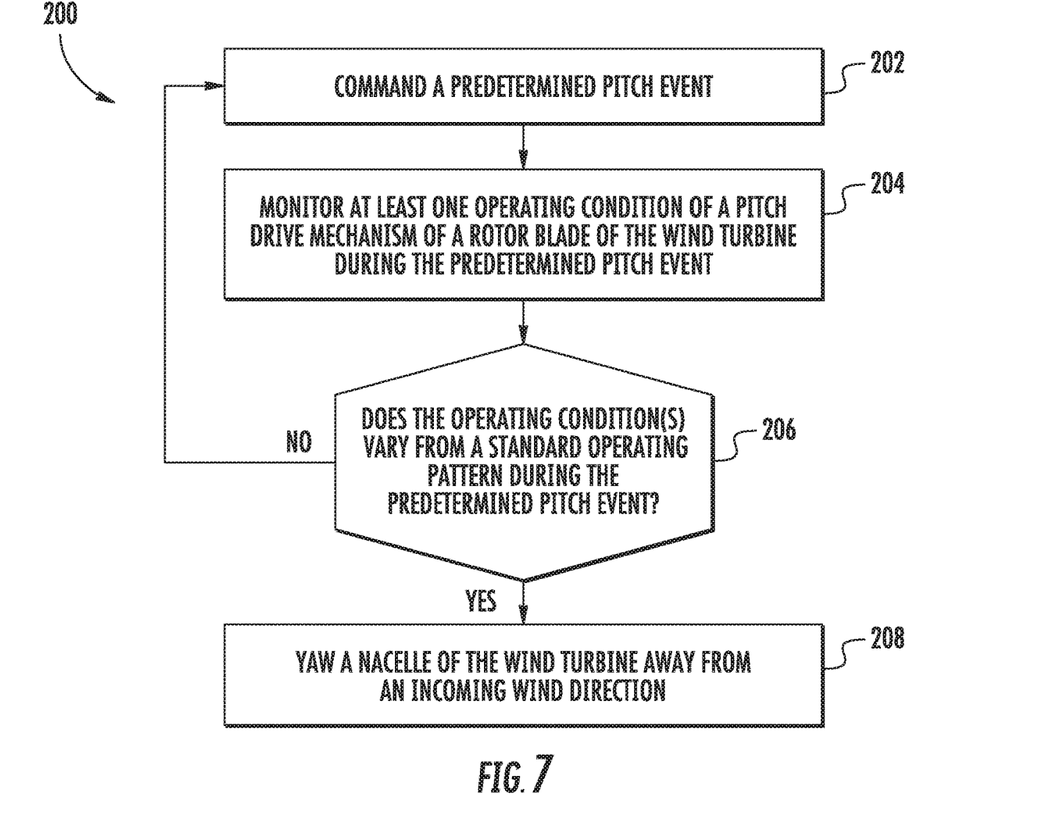
FIG. 7 illustrates a flow diagram of one embodiment of a method for reducing loads of a wind turbine according to the present disclosure.

Referring now to FIG. 7, a flow diagram of another embodiment of a method 200 for reducing loads of the wind turbine 10 in situations where the wind turbine 10 is in an idling or parked state and one or more of the rotor blades 22 is prevented from rotating (i.e. becomes stuck). In general, the method 100 will be described herein with reference to the wind turbine 10 shown in FIGS. 1 and 2, as well as the various controller components shown in FIG. 3. However, it should be appreciated that the disclosed method 100 may be implemented with wind turbines having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 202, the method 200 includes commanding a predetermined pitch event, such as any of the pitch events described herein. As shown at 204, the method 200 includes monitoring at least one operating condition of the pitch drive mechanism 32 of the rotor blade 22 of the wind turbine 10 during the predetermined pitch event. For example, as mentioned, the controller 26 (or the pitch controller 30) may be configured to monitor an operating condition(s) of a pitch actuator 33 of the pitch drive mechanism 32, such as voltage, current, torque, force, pressure, flow rate, or any other suitable parameter thereof.

Still referring to FIG. 7, as shown at 206, the controller 26 is configured to determine whether the operating condition(s) varies from a standard operating pattern during the predetermined pitch event. As used herein, the standard operating pattern (i.e. assuming symmetrical rotor loading) may correspond to a first operating condition of the pitch drive mechanism 32 being proportional to a commanded speed of the pitch drive mechanism 32 and a second operating condition reaching a maximum value during acceleration and plateauing at a lower value during constant speed. For example, the first operating condition may include voltage, whereas the second operating condition may include at least one of current, force, or pressure.

Figure 8:
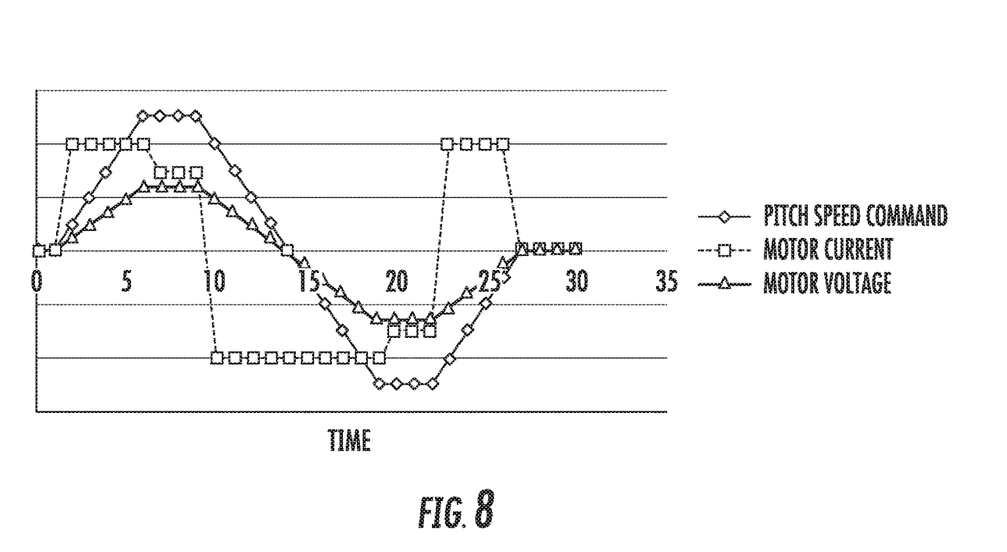
FIG. 8 illustrates a graph of one embodiment of the relationship between pitch speed, current, and voltage during a commanded pitch event for a normal wind turbine assuming symmetrical rotor loading according to the present disclosure.

Referring particularly to FIG. 8, a graph of one embodiment of the relationship between pitch speed, current, and voltage during a commanded pitch event for a normal wind turbine assuming symmetrical rotor loading (i.e. gravity is not affecting the wind turbine 10, e.g. the rotor blade 22 is vertical) according to the present disclosure. As shown, the voltage is mostly proportional to the commanded speed. Further, as shown, the current (or force or hydraulic pressure) reaches a maximum value during acceleration and plateaus at a lower value during constant speed.

As shown at 208, if the operating condition(s) varies from the standard operating pattern during the predetermined pitch event by a predetermined percentage or amount, the method 100 further includes yawing the nacelle 16 of the wind turbine 10 away from the incoming wind direction 28.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing loads of a wind turbine, the method comprising:

determining, via a controller, an operational state of the wind turbine;

commanding, via the controller, a predetermined pitch event for a pitch drive mechanism of a rotor blade of the wind turbine, the predetermined pitch event having a standard operating pattern for at least one operating condition of the pitch drive mechanism, wherein the standard operating pattern comprises at least one parameter of the pitch drive mechanism which reaches a positive maximum value during acceleration of the pitch drive mechanism, remains at the positive maximum value during a constant speed of the predetermined pitch drive mechanism, and has a negative value, the absolute value of which is smaller than the positive maximum value, when the pitch drive mechanism is decelerating;

monitoring, via the controller, the at least one operating condition of the pitch drive mechanism of the rotor blade during the predetermined pitch event comprising monitoring the at least one parameter;

detecting, via the controller, a sustained deviation of the at least one operating condition from the standard operating pattern, wherein the sustained deviation of the at least one operating condition from the standard operating pattern comprises a pitch fault pattern, wherein the pitch fault pattern comprises the at least one parameter of the pitch drive mechanism reaching the positive maximum value and a negative value of equal magnitude to the positive maximum value during the predetermined pitch event; and following the detection of the pitch fault pattern, yawing a nacelle of the wind turbine away from an incoming wind direction.

2. The method of claim 1, wherein monitoring the at least one operating condition of the pitch drive mechanism of the rotor blade further comprises monitoring at least one operating condition of a pitch actuator of the pitch drive mechanism.

3. The method of claim 2, wherein the pitch actuator comprises at least one of a rotary actuator or a linear actuator.

4. The method of claim 3, wherein the predetermined pitch event comprises at least one of acceleration of the pitch drive mechanism to a first speed, dwelling at a predetermined speed for a predetermined time period, and/or deceleration of the pitch drive mechanism to a second speed.

5. The method of claim 4, wherein an acceleration rate of the acceleration requires full motor current of the rotary actuator or actuator force of the linear actuator.

6. The method of claim 1, wherein the at least one operating condition comprises at least one of voltage, current, torque, force, pressure, or flow rate of the pitch drive mechanism.

7. The method of claim 1, wherein the predetermined operational state of the wind turbine comprises at least one of an idling state, a parked state, turbine shutdown, or a maintenance state.

8. The method of claim 1, wherein the pitch fault pattern comprises one or more of the at least one operating conditions remaining substantially constant after initial variation due to system compliance during the predetermined pitch event in a first direction and one or more of the at least one operating conditions being substantially symmetrical for an identical pitch event in an opposite direction.

9. The method of claim 1, further comprising preventing a rotor of the wind turbine from rotating during the predetermined pitch event.

10. The method of claim 1, further comprising monitoring a wind speed at the wind turbine and actively yawing the nacelle of the wind turbine away from the incoming wind direction only if the wind speed exceeds a set wind speed threshold.

11. A system for reducing loads of a wind turbine, the system comprising:

at least one sensor configured for monitoring a rotor blade of the wind turbine;

a controller communicatively coupled to the at least one sensor, the controller comprising at least one processor configured to perform a plurality of operations, the plurality of operations comprising:

determining an operational state of the wind turbine;

commanding a predetermined pitch event for a pitch drive mechanism of the rotor blade of the wind turbine, the predetermined pitch event having a standard operating pattern for at least one operating condition of the pitch drive mechanism, wherein the standard operating pattern comprises at least one parameter of the pitch drive mechanism which reaches a positive maximum value during acceleration of the pitch drive mechanism, remains at the positive maximum value during a constant speed of the predetermined pitch drive mechanism, and has a negative value, the absolute value of which is smaller than the positive maximum value, when the pitch drive mechanism is decelerating;

monitoring the at least one operating condition of a pitch drive mechanism of a rotor blade of the wind turbine during the predetermined pitch event comprising monitoring the at least one parameter;

detecting a sustained deviation of the at least one operating condition from the standard operating pattern, wherein the sustained deviation of the at least one operating condition from the standard operating pattern comprises a pitch fault pattern, wherein the pitch fault pattern comprises the at least one parameter of the pitch drive mechanism reaching the positive maximum value and a negative value of equal magnitude to the positive maximum value during the predetermined pitch event; and following the detection of the pitch fault pattern during the predetermined pitch event, yawing a nacelle of the wind turbine away from an incoming wind direction.

12. The system of claim 11, wherein monitoring the at least one operating condition of the pitch drive mechanism of the rotor blade further comprises monitoring at least one operating condition of a pitch actuator of the pitch drive mechanism.

13. The system of claim 12, wherein the pitch actuator comprises at least one of a rotary actuator or a linear actuator, the at least one operating condition comprising at least one of voltage, current, torque, force, pressure, or flow rate of the pitch drive mechanism.

14. The system of claim 13, wherein the predetermined pitch event comprises at least one of acceleration of the pitch drive mechanism to a first speed, dwelling at a predetermined speed for a predetermined time period, and/or deceleration of the pitch drive mechanism to a second speed.

15. The system of claim 14, wherein an acceleration rate of the acceleration requires full motor current of the pitch drive motor or actuator force of the pitch hydraulic device.

16. The system of claim 11, wherein the operational state of the wind turbine comprises at least one of an idling state, a parked state, turbine shutdown, or a maintenance state.

17. The system of claim 11, wherein the pitch fault pattern comprises one or more of the operating conditions remaining substantially constant after initial variation due to system compliance during the predetermined pitch event in a first direction and one or more operating conditions being substantially symmetrical for an identical pitch event in an opposite direction.

18. The system of claim 11, wherein determining the operational state of the wind turbine further comprises preventing a rotor of the wind turbine from rotating during the predetermined pitch event.

* * * * *